(12) United States Patent
Park et al.

(10) Patent No.: US 7,755,380 B2
(45) Date of Patent: Jul. 13, 2010

(54) REPAIRING MANUFACTURING DEFECTS IN FLAT PANEL DISPLAYS

(75) Inventors: Myung-Il Park, Daejeon-si (KR);
Yeong-Beom Lee, Cheonan-si (KR);
Kyung-Seop Kim, Suwon-si (KR);
Yong-Eui Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 346 days.

(21) Appl. No.: 11/545,038

(22) Filed: Oct. 6, 2006

(65) Prior Publication Data

US 2007/0081105 A1    Apr. 12, 2007

(30) Foreign Application Priority Data

Oct. 6, 2005    (KR) ...................... 10-2005-0093713

(51) Int. Cl.
*G01R 31/00* (2006.01)
*G02F 1/1339* (2006.01)

(52) U.S. Cl. ....................... 324/770; 349/156
(58) Field of Classification Search .................. None
See application file for complete search history.

(56) References Cited

U.S. PATENT DOCUMENTS

| | | | | |
|---|---|---|---|---|
| 6,072,559 | A * | 6/2000 | Kanemori et al. | 324/770 |
| 6,476,882 | B1 * | 11/2002 | Sakurai | 349/55 |
| 6,812,992 | B2 | 11/2004 | Nemeth | |
| 6,980,264 | B2 * | 12/2005 | Lee et al. | 349/192 |
| 7,098,989 | B2 * | 8/2006 | Wu | 349/192 |
| 7,221,423 | B2 * | 5/2007 | Park et al. | 349/146 |
| 7,313,080 | B2 * | 12/2007 | Shiono et al. | 369/275.1 |
| 7,595,855 | B2 * | 9/2009 | Lee et al. | 349/156 |
| 2001/0028429 | A1 * | 10/2001 | Wu | 349/139 |
| 2002/0101558 | A1 | 8/2002 | Nemeth | |
| 2004/0239364 | A1 * | 12/2004 | Chung | 324/770 |

(Continued)

FOREIGN PATENT DOCUMENTS

JP    11-133369    5/1999

(Continued)

OTHER PUBLICATIONS

Patent Abstracts of Japan, Publication No. 11-133369, May 21, 1999, 1 p.

(Continued)

*Primary Examiner*—Jermele M Hollington
(74) *Attorney, Agent, or Firm*—Innovation Counsel LLP

(57) ABSTRACT

Apparatus and methods for repairing display devices of a type that include a first substrate having a plurality of signal lines formed thereon and/or a second substrate having a plurality of color filters formed thereon include a laser that radiates laser light having a wavelength in a range of from about 750 to about 850 nm, or alternatively, of from about 1000 to about 1100 nm, and a pulse width of femtoseconds ($10^{-15}$ seconds) to picoseconds ($10^{-12}$ seconds) and arranged such that the laser light can be focused on selected ones of the signal lines and/or color filters. The apparatus enables repairs to be effected on the display device during any one of several manufacturing test processes using only a single laser apparatus, without the need for additional or different repair devices for each test process.

21 Claims, 11 Drawing Sheets

U.S. PATENT DOCUMENTS

| | | | |
|---|---|---|---|
| 2005/0032285 A1 | 2/2005 | Imahara et al. | |
| 2005/0219454 A1* | 10/2005 | Lee | 349/153 |
| 2006/0050223 A1* | 3/2006 | Umetsu | 349/192 |
| 2006/0087321 A1* | 4/2006 | Kawada et al. | 324/392 |
| 2006/0205103 A1* | 9/2006 | Tamura et al. | 438/132 |
| 2006/0279681 A1* | 12/2006 | Kwon et al. | 349/122 |
| 2007/0070287 A1* | 3/2007 | Lee et al. | 349/156 |
| 2007/0139607 A1* | 6/2007 | Nam et al. | 349/187 |
| 2007/0141942 A1* | 6/2007 | Kawaguchi et al. | 445/2 |
| 2007/0263134 A1* | 11/2007 | Kim et al. | 349/54 |
| 2008/0090342 A1* | 4/2008 | Lee et al. | 438/158 |
| 2008/0094563 A1* | 4/2008 | Lee | 349/153 |
| 2008/0096332 A1* | 4/2008 | Lee et al. | 438/151 |

FOREIGN PATENT DOCUMENTS

| | | |
|---|---|---|
| JP | 2002-6510 | 1/2002 |
| JP | 2002-268081 | 9/2002 |
| JP | 2002-341304 | 11/2002 |
| JP | 2003-279722 | 10/2003 |
| JP | 2004-160520 | 6/2004 |
| JP | 2004-279639 | 10/2004 |
| KR | 2001-0007525 | 1/2001 |
| KR | 2003-0000411 | 1/2003 |
| KR | 2005-0030411 | 3/2005 |

OTHER PUBLICATIONS

Patent Abstracts of Japan, Publication No. 2002-006510, Jan. 9, 2002, 1 p.
Patent Abstracts of Japan, Publication No. 2002-268081, Sep. 18, 2002, 1 p.
Patent Abstracts of Japan, Publication No. 2002-341304, Nov. 27, 2002, 1 p.
Patent Abstracts of Japan, Publication No. 2003-279722, Oct. 2, 2003, 1 p.
Patent Abstracts of Japan, Publication No. 2004-160520, Jun. 10, 2004, 1 p.
Patent Abstracts of Japan, Publication No. 2004-279639, Oct. 7, 2004, 1 p.
Korean Patent Abstracts, Publication No. 1020010007525, Jan. 26, 2001, 1 p.
Korean Patent Abstracts, Publication No. 1020030000411, Jan. 6, 2003, 1 p.
Korean Patent Abstracts, Publication No. 1020050030411, Mar. 30, 2005, 1 p.

* cited by examiner

REPAIRING MANUFACTURING DEFECTS IN FLAT PANEL DISPLAYS

RELATED APPLICATIONS

This application claims priority of Korean Patent Application No. 10-2005-0093713, filed Oct. 6, 2005, the entire contents of which are incorporated herein by reference.

BACKGROUND

The present invention relates to apparatus and methods for repairing manufacturing defects in flat panel display devices, such as liquid crystal display (LCD) devices.

A typical LCD includes two display panels respectively having pixel electrodes and a common electrode, and a liquid crystal layer having dielectric anisotropy interposed between the display panels. The pixel electrodes are arranged in a matrix shape, and are respectively connected to corresponding switching elements, such as thin film transistors (TFTs), such that a data voltage is sequentially applied to the pixel electrodes row by row. The common electrode is formed on the entire surface of one of the display panels, and a common voltage is applied to the common electrode. The pixel electrodes, the common electrode, and the liquid crystal layer interposed therebetween constitute a liquid crystal capacitor, and the liquid crystal capacitor forms a basic unit of a pixel in conjunction with the switching element connected thereto.

In a LCD, a voltage is applied between two electrodes so as to form an electric field in the liquid crystal layer, and the intensity of the electric field is controlled so as to adjust the transmittance of light passing through the liquid crystal layer, thereby generating a desired light image. Additionally, color filters of three primary colors, for example, red, green, and blue, are provided in the common electrode region to correspond to the pixel electrodes, thereby realizing a color display.

LCDs are subjected to many tests during their manufacture, and any defects that are found during the tests must either be repaired or the panels scrapped, resulting in expensive waste.

For example, when the display signal lines are disconnected or short-circuited, or when defective pixels exist, these may be detected through certain testing procedures. These tests include an array test, a visual inspection (VI) test, a "gross" test, a module test, and so on.

The array test is performed before a "mother" glass panel is divided into separate cells, and determines disconnection of the display signal lines by applying a selected voltage to the lines and detecting whether a corresponding output voltage is generated. The VI test is performed after the mother glass is divided into separate cells, and determines disconnection of the display signal lines by applying a selected voltage to the lines and then viewing the display panels. The gross test is performed after upper and lower display panels are combined and driving circuits have been mounted, and determines image quality and disconnection of the display signal lines by applying a selected voltage to the lines that is identical to an actual driving voltage and then viewing display states of the screen. The module test is performed after the driving circuits are mounted and polarizers have been attached to the outsides of the two display panels, and determines the optimum operation of the driving circuits.

The gross test, which is intended to simulate an actual driving situation, determines defective pixels while the entire screen is blackened. In this condition, an unusually bright or "high pixel" phenomenon, that is, a "shining" of a defective pixel may occur due to foreign substances in the liquid crystal layer or the disconnection or short-circuit of wiring lines. The bright or high pixel phenomenon can occur in most types of flat panel display devices, as well as in the above-described LCDs.

In order to repair defective pixels, such as the high pixels described above, a light-shielding film can be formed on the display panel that covers a region of the outside of the panel corresponding to the position of the high pixel using, e.g., a chemical vapor deposition method or the like. However, this repair method can be problematical in that the light from the defective pixel does not leak from the front side of a display device, but instead, from a lateral side thereof, which makes it impossible to effect a complete repair. What is needed then are apparatus and methods that enable the complete, effective repair of defective pixels of a display device during its manufacture.

BRIEF SUMMARY

In accordance with the exemplary embodiments thereof described herein, the present invention provides methods and apparatus for repairing manufacturing defects of a display device, e.g., an LCD device, during the manufacture thereof.

In one exemplary embodiment, the apparatus for repairing a display device of a type that includes a first substrate having a plurality of signal lines formed thereon comprises a laser that radiates laser light having a selected wavelength and a pulse width of from femtoseconds ($10^{-15}$ seconds) to picoseconds ($10^{-12}$ seconds) such that the laser light can be focused on each of the signal lines of the panel. The selected wavelength of the laser light is preferably in a range of from about 750 to about 850 nm, or alternatively, in a range of from about 1000 to about 1100 nm.

The display device being repaired may further include a second substrate that faces the first substrate and on which color filters are formed. Each of the color filters may include a first side that faces the second substrate and a second side that faces away from the second substrate and toward the first substrate. The laser light is preferably focused on and radiated onto the first side of the color filters to effect repairs.

In one possible embodiment, the laser light may be radiated through the second substrate. In this embodiment, the laser light may be radiated through a slit mask having a transmissive region and a light-shielding region.

The display device being repaired may further include a light source unit that supplies light to the color filters. Transmittance of selected ones of the color filters can be changed when the laser light is radiated onto the selected color filters. Specifically, after irradiation by the laser, the color filter onto which the laser light was radiated functions to absorb the light from the light source unit.

The display device may further include a light-shielding member formed of an organic material that surrounds the color filters. In this embodiment, the laser light source of the laser is preferably a Ti:Sapphire or a YDFL (i.e., a Yb-doped-fiber laser) light source.

The display device may further include a polarizer that is attached to the outside of the second substrate, and the laser light may be radiated through the polarizer. In this embodiment, the laser light is preferably radiated through a slit mask having a transmissive region and a light-shielding region.

An exemplary embodiment of a method for repairing a display device that includes a first substrate with a plurality of signal lines formed thereon includes testing the display device for defects, positioning a laser above the display device, focusing laser light radiated from the laser device onto selected ones of the signal lines, and radiating the laser light onto the selected signal lines of the substrate. The laser light preferably has a wavelength in the range of between about 750 to about 850 nm, or alternatively, between about 1000 to about 1100 nm, and a pulse width of femtoseconds to picoseconds.

A better understanding of the above and many other features and advantages of the display repair apparatus and methods of the invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

DETAILED DESCRIPTION

Figure 1:
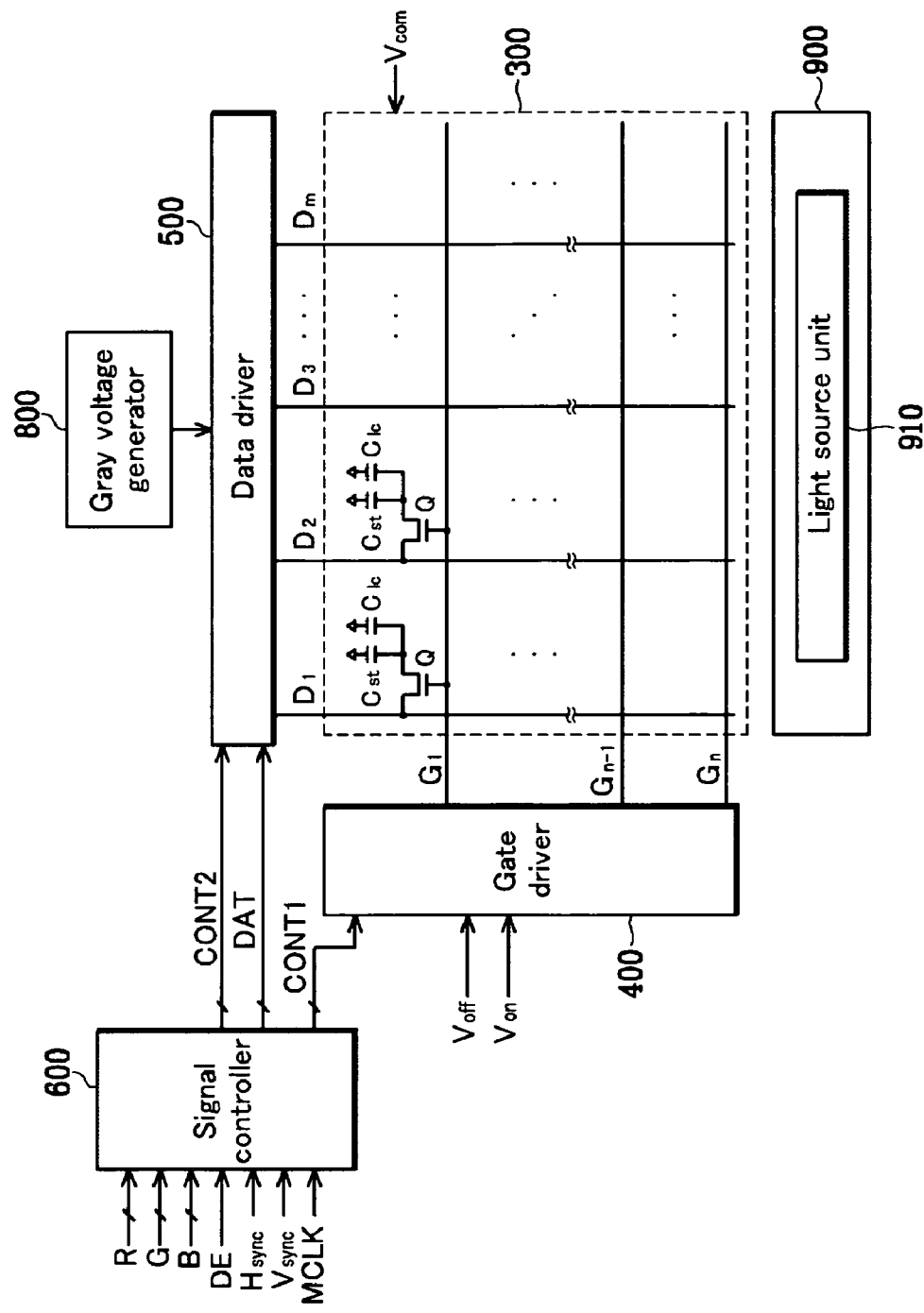
FIG. 1 is a functional block diagram of an exemplary embodiment of a liquid crystal display (LCD) device of a type to which the repair apparatus and methods of the present invention have advantageous application.
Figure 2:
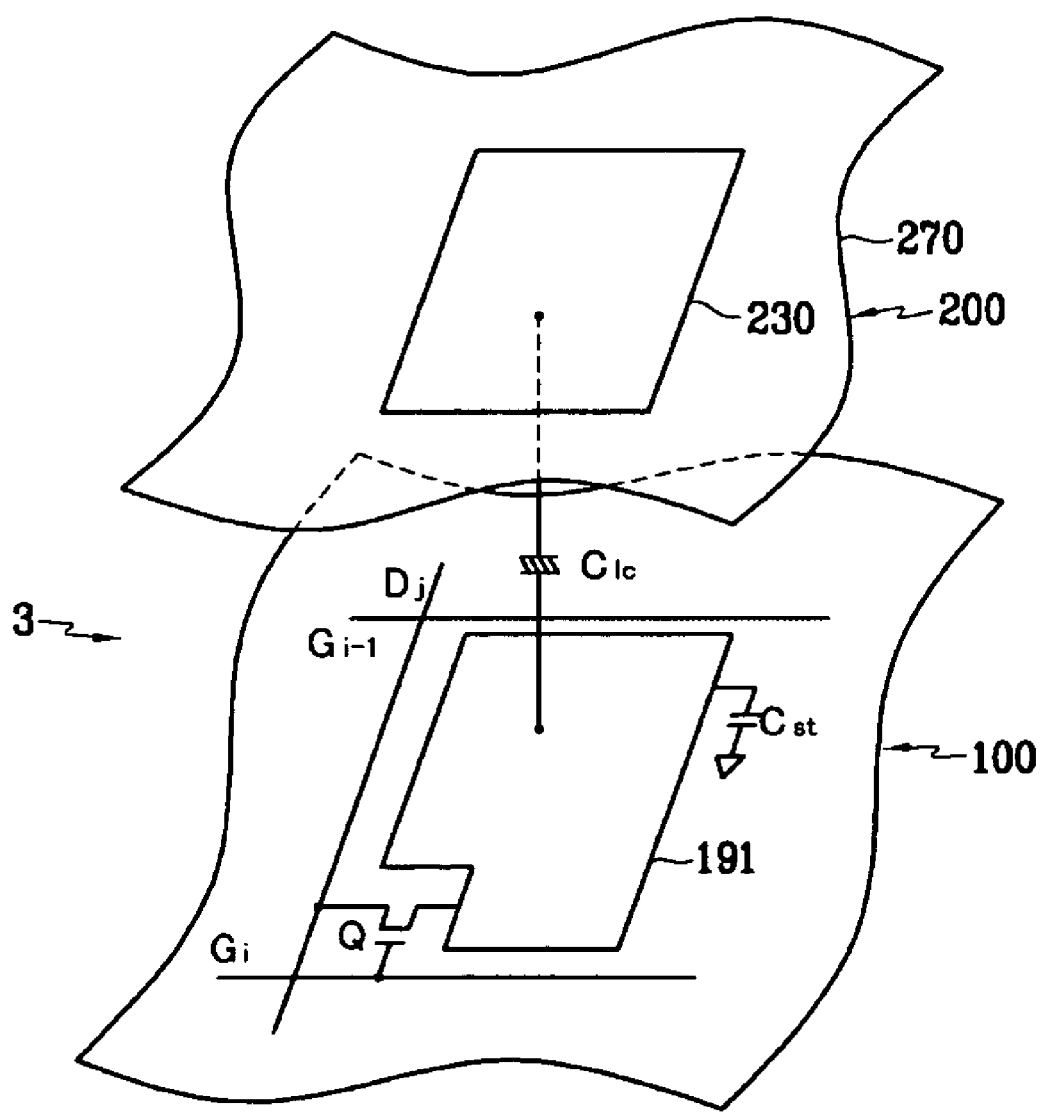
FIG. 2 is a partial schematic perspective view of a pixel of the exemplary LCD of FIG. 1.

FIG. 1 is a functional block diagram of an exemplary embodiment of a liquid crystal display (LCD) device of a type to which the repair apparatus and methods of the present invention have advantageous application, and FIG. 2 is a partial schematic perspective view of a representative pixel of the exemplary LCD. As shown in FIG. 1, the LCD includes an LCD panel assembly 300, a gate driver 400 and a data driver 500 that are connected to the LCD panel assembly 300, a gray voltage generator 800 that is connected to the data driver 500, a backlight device 900 that irradiates light onto the panel assembly 300, and a signal controller 600 that controls all of them.

The LCD panel assembly 300 includes a plurality of signal lines $G_1$ to $G_n$ and $D_1$ to $D_m$, and a plurality of pixels that are correspondingly connected to the signal lines and arranged in a matrix form in view of an equivalent circuit. The display signal lines $G_1$ to $G_n$ and $D_1$ to $D_m$ include a plurality of gate lines $G_1$ to $G_n$ that transmit gate signals (also referred to as "scanning signals"), and data lines $D_1$ to $D_m$ that transmit data signals. The gate lines $G_1$ to $G_n$ extend in a row direction and are arranged substantially parallel to each other, and the data lines $D_1$ to $D_m$ extend in a column direction and are arranged substantially parallel to each other.

Each of the pixels includes a switching element Q that is connected to a corresponding one of the display signal lines $G_1$ to $G_n$ or $D_1$ to $D_m$, and a liquid crystal capacitor $C_{lc}$ and a storage capacitor $C_{st}$ that are connected to the switching element Q. In some cases, the storage capacitor $C_{st}$ may be omitted. The switching element Q, such as a thin film transistor or the like, is provided on a lower display panel 100. The switching element Q is a three-terminal element, a control terminal and an input terminal of which are respectively connected to a corresponding one of the gate lines $G_1$ to $G_n$ and a corresponding one of the data lines $D_1$ to $D_m$, and an output terminal of which is connected to the liquid crystal capacitor $C_{lc}$ and the storage capacitor $C_{st}$.

The liquid crystal capacitor $C_{lc}$ has two terminals of a pixel electrode 191 on the lower display panel 100 and a common electrode 270 on an upper display panel 200, and a liquid crystal layer 3 that is interposed between the two electrodes 191 and 270 so as to serve as a dielectric material. The pixel electrode 191 is connected to the switching element Q, the common electrode 270 is formed on the entire surface of the upper display panel 200, and a common voltage $V_{com}$ is applied to the common electrode 270. Unlike the case of FIG. 2, the common electrode 270 may be provided on the lower display panel 100. In this embodiment, at least one of the two electrodes 191 and 270 may have a linear or bar shape.

A separate signal line (not illustrated), disposed on the lower display panel 100, and the pixel electrode 191 overlap each other with an insulator interposed therebetween so as to form the storage capacitor $C_{st}$, which assists the liquid crystal capacitor $C_{lc}$. A predetermined voltage, such as the common voltage $V_{com}$, is applied to the separate signal line. However, the pixel electrode 191 and an adjacent gate line that is disposed just above the pixel electrode 191 may overlap each other through the insulator so as to form the storage capacitor $C_{st}$.

In order to realize color display, it is necessary for each pixel to uniquely display one of three primary colors (spatial division) or alternately, to display the three primary colors as time passes (temporal division). Then, the three primary colors are spatially or temporally synthesized, thereby obtaining a desired color display. FIG. 2 shows an example of spatial division. Specifically, FIG. 2 shows that each pixel has one of a red, green, and blue color filter 230 in a region corresponding to the pixel electrode 191. Unlike FIG. 2, each color filter 230 may be formed above or below the pixel electrode 191 on the lower display panel 100.

A back light device 900 of the device includes an inverter (not shown) and a light source unit 910. The light source unit 910 is disposed below the liquid crystal panel assembly 300 and includes at least one lamp. A cold cathode fluorescent lamp (CCFL) or an external electrode fluorescent lamp (EEFL) can be used as the lamp. Further, a light emitting diode (LED) may be also used.

Polarizers (not shown) are attached to the outsides of the two display panels 100 and 200 of the liquid crystal panel assembly 300 and function to polarize light emitted from the light source unit 910.

A gray voltage generator 800 generates two sets of gray voltages relative to transmittance of the pixels. One set of voltages has a positive value with respect to the common voltage $V_{com}$, and the other set of voltages has a negative value with respect to the common voltage $V_{com}$.

The gate driver 400 is connected to the gate lines $G_l$ to $G_n$ of the liquid crystal panel assembly 300 so as to apply the gate signals, formed by combining a gate-on voltage $V_{on}$ and a gate-off voltage $V_{off}$, to the gate lines $G_l$ to $G_n$. The gate driver 400 typically includes a plurality of integrated circuits.

The data driver 500 is connected to the data lines $D_l$ to $D_m$ of the liquid crystal panel assembly 300 so as to select a gray voltage from the gray voltage generator 800 and then apply the selected gray voltage as the data signals to the pixels. The data driver 500 typically includes a plurality of integrated circuits.

The plurality of gate driving integrated circuits or data driving integrated circuits may be provided in the liquid crystal panel assembly 300 using a COG (Chip On Glass) method. Alternatively, the integrated circuits may be mounted on a Tape Carrier Package (TCP) and the TCP may be attached to the liquid crystal panel assembly 300. Further, circuits that perform the same functions as these integrated circuit chips may be directly formed in the liquid crystal panel assembly 300.

The signal controller 600 controls the operations of the gate driver 400, the data driver 500, and so on.

The operation of the LCD will now be described in detail.

The signal controller 600 receives input image signals R, G, and B and input control signals, for example, a vertical synchronizing signal $V_{sync}$, a horizontal synchronizing signal $H_{sync}$, a main clock MCLK, and a data enable signal DE for controlling display of the input image signals, from an external graphic controller (not shown). The signal controller 600 properly processes the input image signals R, G, and B depending on the operation conditions of the liquid crystal panel assembly 300 on the basis of the input image signals R, G, and B and the input control signals, and generates a gate control signal CONT1 and a data control signal CONT2. Then, the signal controller 600 transmits the gate control signal CONT1 to the gate driver 400, and transmits the data control signal CONT2 and processed image data DAT to the data driver 500.

The gate control signal CONT1 includes a vertical synchronization start signal STV for indicating the start of an output of the gate-on voltage, a gate clock signal CPV for controlling an output time of the gate-on voltage $V_{on}$, and an output enable signal OE for controlling the duration of the gate-on voltage $V_{on}$.

The data control signal CONT2 includes a horizontal synchronization start signal STH for indicating the start of an input of image data DAT, a load signal LOAD for instructing to apply the corresponding data voltage to the data lines $D_l$ to $D_m$, an inversion signal RVS for inverting a polarity of the data voltage with respect to the common voltage $V_{com}$ (hereinafter, "the polarity of the data voltage with respect to the common voltage" is simply referred to as "the polarity of the data voltage:), a data clock signal HCLK, and so on.

The data driver 500 sequentially receives image data DAT for the pixels of one row according to the data control signal CONT2 from the signal controller 600, shifts the data, and selects a gray voltage corresponding to the image data DAT among the gray voltages from the gray voltage generator 800.

The image data DAT is then converted into the corresponding data voltage and is applied to the corresponding one of the data lines $D_l$ to $D_m$.

The gate driver 400 applies the gate-on voltage $V_{on}$ to the gate lines $G_l$ to $G_n$ according to the gate control signal CONT1 from the signal controller 600 so as to turn on the switching elements Q connected to the gate lines $G_l$ to $G_n$. Then, the data voltage that is applied to the data lines $D_l$ to $D_m$ is applied to the corresponding pixels through the turned-on switching elements Q.

A difference between the data voltage and the common voltage $V_{com}$ that are applied to the pixel corresponds to a charging voltage of the liquid crystal capacitor $C_{lc}$, that is, a pixel voltage. The alignment of liquid crystal molecules varies depending on the size of the pixel voltage, and the polarization of light that is emitted from the light source unit 910 is changed depending on the alignment of the liquid crystal molecules when light passes through the liquid crystal layer 3. The change in polarization causes a change in transmittance of light due to the polarizer.

After one horizontal cycle (also referred to as "1H," i.e., one cycle of the horizontal synchronizing signal $H_{sync}$, the data enable signal DE, and the gate clock signal CPV) passes, the data driver 500 and the gate driver 400 repeat the same operation for the pixels of the next row. In such a manner, the gate-on voltage $V_{on}$ is sequentially applied to all of the gate lines $G_l$ to $G_n$ for one frame such that the data voltage is applied to all the pixels. After one frame is ended, a next frame starts. Then, the state of the inversion signal RVS that is applied to the data driver 500 is controlled such that the polarity of a data voltage applied to each pixel is opposite to the polarity of the data voltage in the prior frame ("frame inversion"). In this case, the polarity of the data voltage on one data line may be inverted (for example, row inversion or dot inversion) or the polarity of the data voltage applied to one pixel row may vary (for example, column inversion or dot inversion) depending on the characteristics of the inversion signal RVS, even in one frame.

The structure of the exemplary LCD will now be described in detail with reference to FIGS. 3 to 6.

Figure 3:
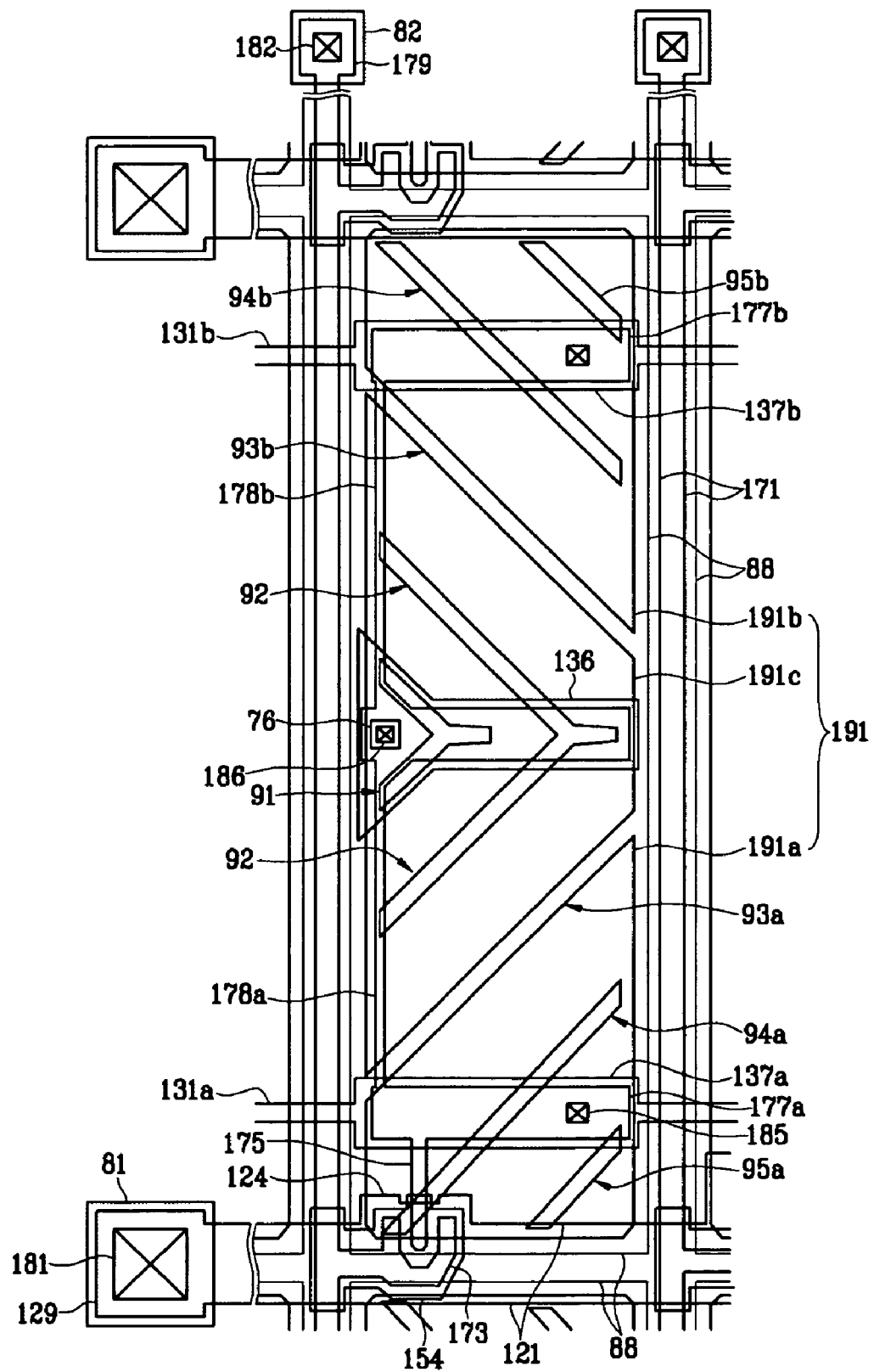
FIG. 3 is a partial plan view of a thin film transistor (TFT) panel of the LCD.
Figure 4:
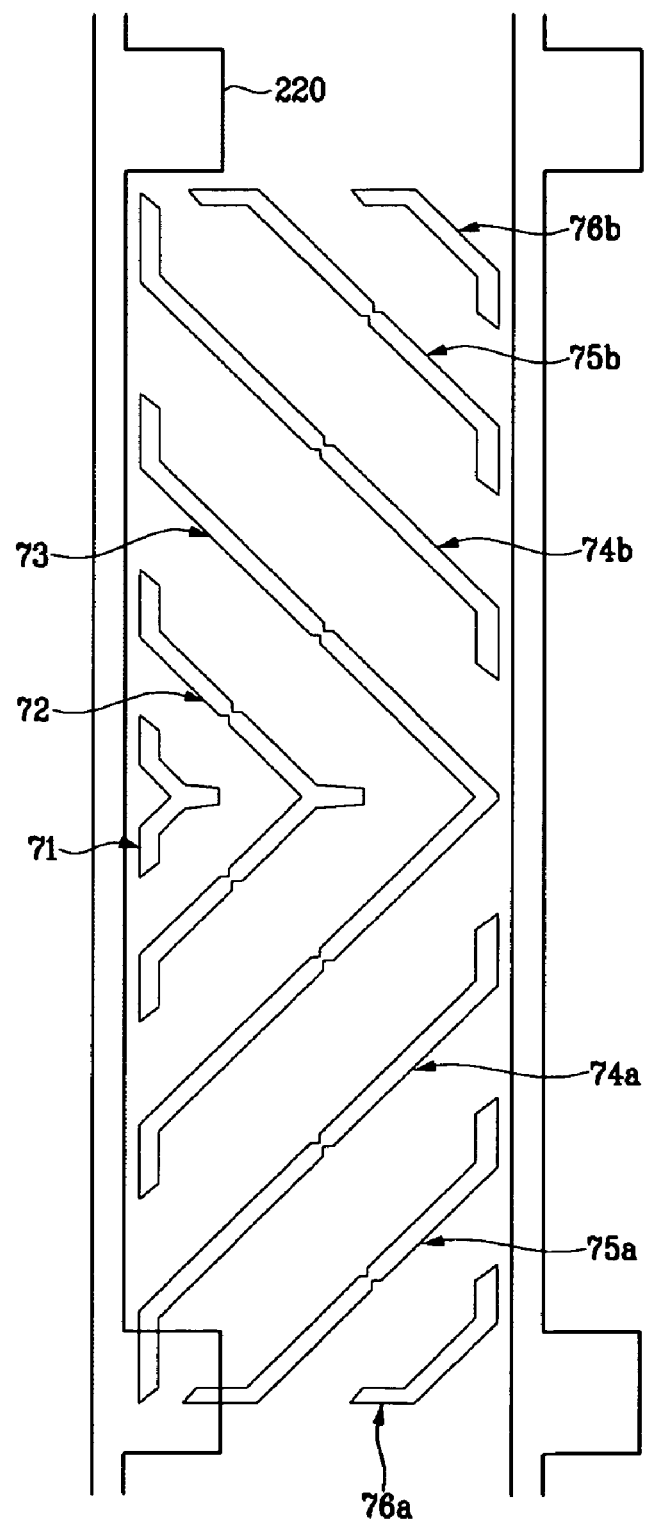
FIG. 4 is a partial plan view of a common electrode panel of the LCD.
Figure 5:
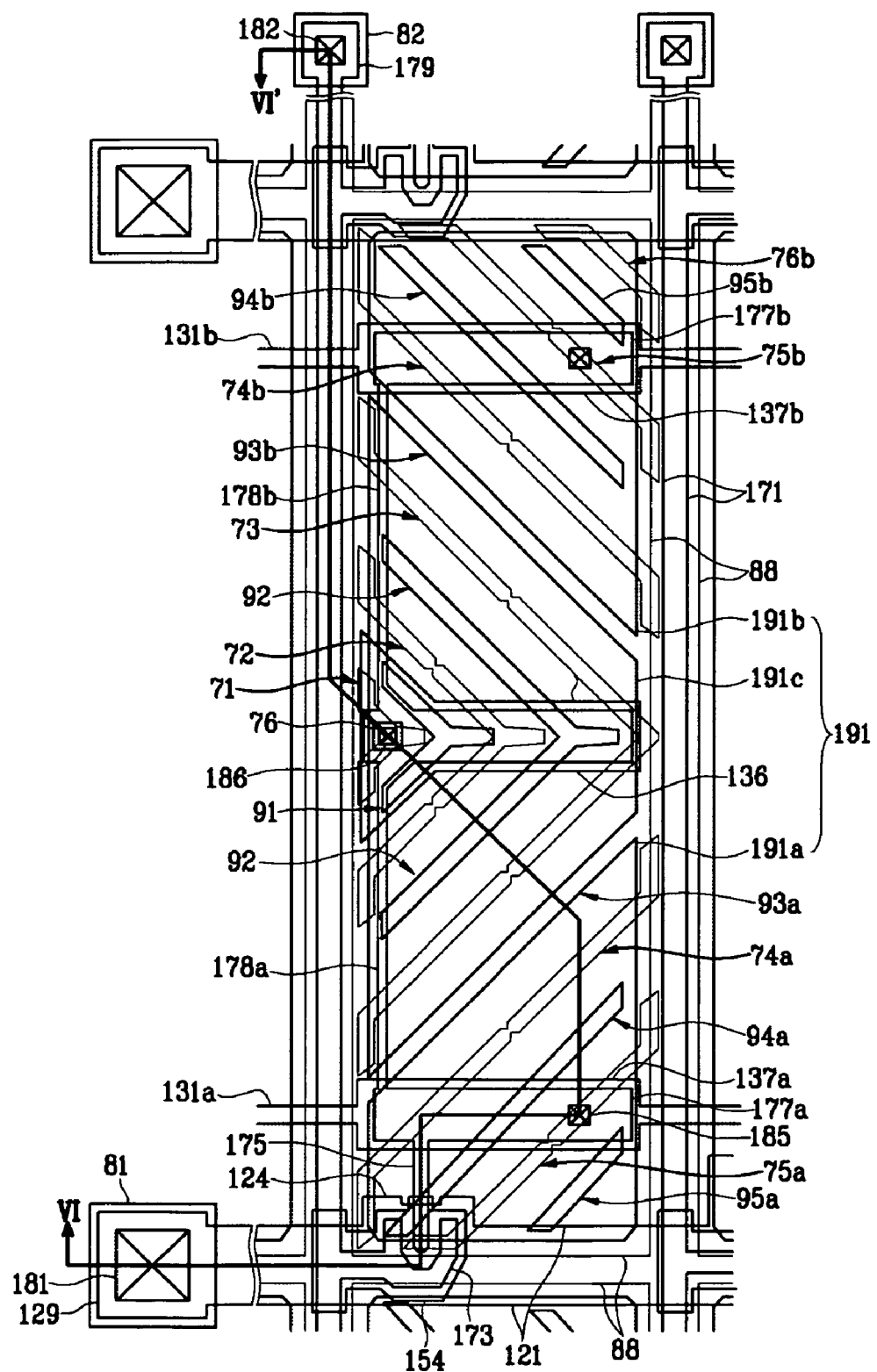
FIG. 5 is a partial plan view of the common electrode panel of FIG. 4 superimposed over the TFT panel of FIG. 3.
Figure 6:
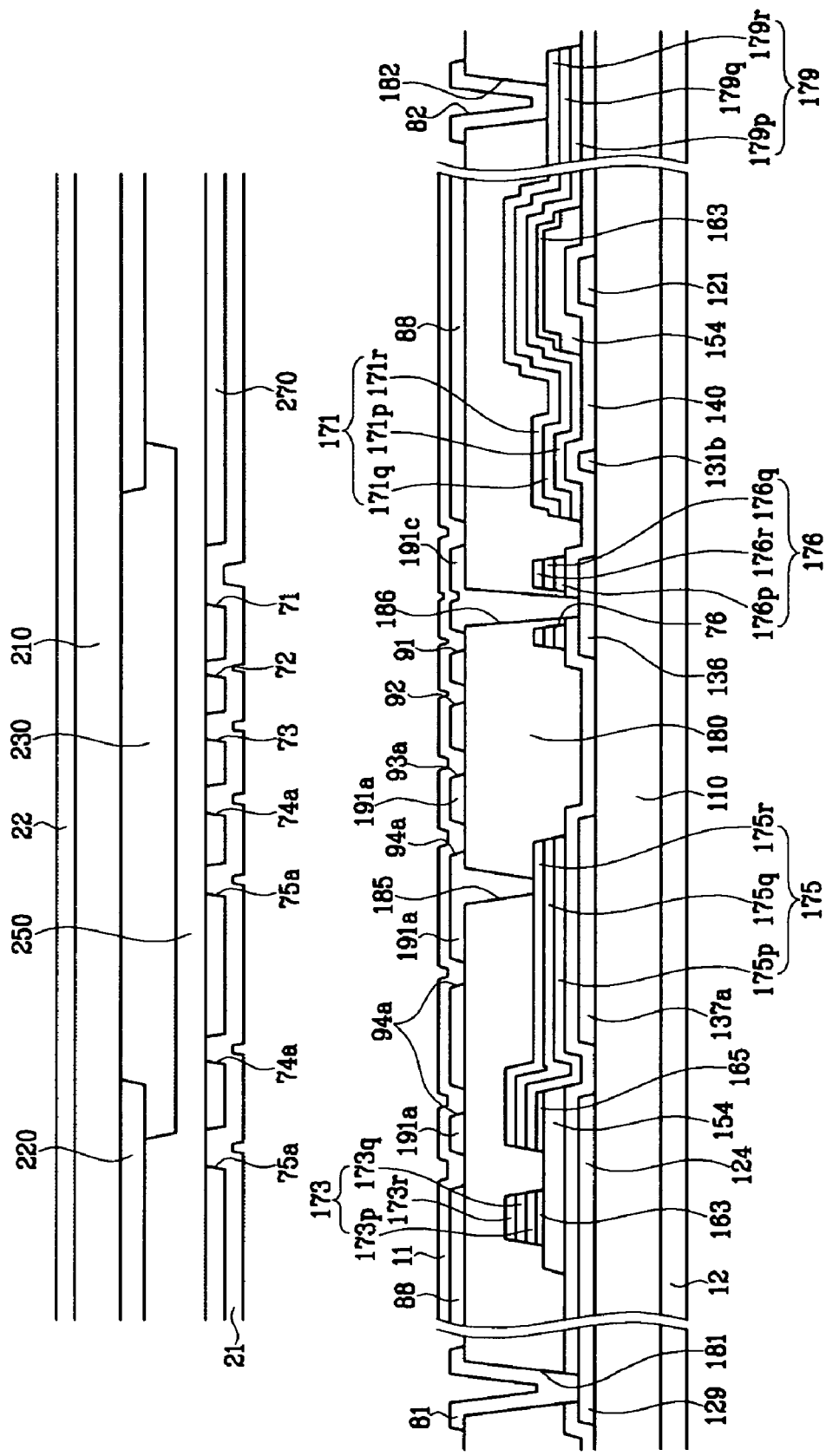
FIG. 6 is a cross-sectional view of the LCD as seen along the section lines VI-VI taken in FIG. 5.

FIG. 3 is a partial plan view of a thin film transistor (TFT) panel of the LCD, FIG. 4 is a partial plan view of a common electrode panel of the LCD, and FIG. 5 is a partial plan view of the common electrode panel of FIG. 4 superimposed over the TFT panel of FIG. 3. FIG. 6 is a cross-sectional view of the LCD as seen along the section lines VI-VI taken in FIG. 5.

As may be seen by reference to these figures, the LCD includes a TFT display panel 100, a common electrode display panel 200, and a liquid crystal layer 3 interposed between the two display panels 100 and 200.

The TFT display panel 100 comprises a plurality of gate lines 121, a plurality of storage electrode lines 131a and 131b, and a plurality of capacitive auxiliary electrodes 136 are formed on an insulating substrate 110. The gate lines 121 extend in a substantially horizontal direction, are separated from one another, and transmit the gate signals. Each of the gate lines 121 includes a plurality of gate electrodes 124 that protrude upward and an end portion 129 that has a wide area and is arranged for connection to other layers or to an external device.

Each of the storage electrode lines 131a and 131b extends in a substantially horizontal direction, and a pair of storage electrode lines 131a and 131b is disposed between adjacent gate lines 121. Each of the storage electrode lines 131a and 131b is provided in the periphery of an adjacent gate line 121, and includes storage electrodes 137a and 137b that respectively protrude upward and downward. Two storage electrode lines 131a and 131b are symmetrical with respect to a horizontal line disposed at the center of an adjacent gate line 121. A predetermined voltage, such as the common voltage that is applied to the common electrode 270 on the common electrode display panel 200 of the LCD, is applied to the storage electrode lines 131a and 131b.

Each of the capacitive auxiliary electrodes 136 is disposed at the center of two adjacent gate lines 121 and has a rectangular shape extending in the horizontal direction. One end portion thereof has oblique sides that incline at an angle of about 45° with respect to the gate lines 121 to form a funnel shape.

The gate lines 121, the storage electrode lines 131a and 131b, and the capacitive auxiliary electrodes 136 are preferably formed of an aluminum-based metal, a silver-based metal, a copper-based metal, a molybdenum-based metal, chromium, titanium, or tantalum. Further, these structures may have a single-layer structure or a multilayer structure. The multilayer structures may include, for example, two layers having different physical properties, that is, a lower layer and an upper layer. A conductive layer may be formed of a metal having low resistivity, for example, an aluminum-based metal, such as aluminum (Al) or an aluminum alloy, a silver-based metal, such as silver (Ag) or a silver alloy, or a copper-based metal, such as copper (Cu) or a copper alloy, so as to reduce signal delay or voltage drop. Alternatively, the conductive layer may be formed of another material, particularly, a material having excellent contact characteristics to Indium Tin Oxide (ITO) and Indium Zinc Oxide (IZO), for example, chromium, molybdenum (Mo), a molybdenum alloy, tantalum (Ta), or titanium (Ti). Examples of the conductive layers include a chromium/aluminum-neodymium (Nd) alloy, molybdenum or a molybdenum alloy/an aluminum alloy.

Further, walls of the gate lines 121, the storage electrode lines 131a and 131b, and the capacitive auxiliary electrodes 136 are inclined with respect to a surface of the substrate 110. Preferably, an inclination angle is in a range of 30 to 80°.

A gate insulating layer 140, formed of silicon nitride ($SiN_x$), is formed on the gate lines 121, the storage electrode lines 131a and 131b, and the capacitive auxiliary electrodes 136.

A plurality of island-shaped semiconductor layers 154, formed of hydrogenated amorphous silicon (amorphous silicon or a-Si), are formed on the gate insulating layer 140. Each of the island-shaped semiconductor layers 154 is located on an upper part of the gate electrodes 124, and extends to an upper part of the gate lines 121 on which the data lines 171 are to be provided. A buffer layer may be additionally provided on an upper part of the storage electrodes lines 131, on which the data lines 171 are to be provided, in the same layer as the island-shaped semiconductor layer 154.

A plurality of island-shaped ohmic contacts 163 and 165, formed of a material, such as n+hydrogenated amorphous silicon doped with an n-type impurity such as silicide or phosphorus with a high concentration, are formed on the semiconductor layer 154. Two island-shaped ohmic contacts 163 and 165 are disposed on the semiconductor layer 154 in a pair, and face each other with respect to the gate electrodes 124.

Walls of the island-shaped semiconductor layer 154 and the ohmic contacts 163 and 165 are also inclined with respect to the surface of the substrate 110. Preferably, an inclination angle is in a range of 30 to 80°.

A plurality of data lines 171, a plurality of drain electrodes 175 separated from the data lines 171, and a capacitive coupling electrode 176 connected to the drain electrodes 175 are formed on the ohmic contacts 163 and 165 and the gate insulating layer 140.

The data lines 171 extend in a substantially vertical direction so as to intersect the gate lines 121 and the storage electrode lines 131a and 131b, and the data voltage is applied through the data lines 171. Each of the data lines 171 has a wide end portion 179 that is to be connected to other layers or an external device.

Each of the drain electrodes 175 includes rectangular extending portions 177a and 177b that overlap the storage electrodes 137a and 137b. Sides of the extending portions 177a and 177b of the drain electrodes 175 are substantially disposed in parallel with sides of the storage electrodes 137a and 137b, and are symmetrical with respect to the central line of adjacent gate lines 121. Each of the data lines 171 includes a plurality of protrusions, each forming a source electrode 173 that partially surrounds one end portion of one drain electrode 175 formed on the semiconductor layer 154. One gate electrode 124, one source electrode 173, and one drain electrode 175 form one thin film transistor (TFT) in conjunction with the semiconductor layer 154, and a channel of the thin film transistor is formed in the semiconductor layer 154 between the source electrode 173 and the drain electrode 175.

The capacitive coupling electrode 176 overlaps the capacitive auxiliary electrode 136, and has sides that are disposed in parallel with sides of the capacitive auxiliary electrode 136. A left part of the capacitive coupling electrode 176 has a funnel shape. The capacitive coupling electrode 176 has an opening 76 that is disposed above the capacitive auxiliary electrode 136 within a boundary line.

The two extending portions 177a and 177b of the drain electrode 175 are connected to the capacitive coupling electrode 176 through the drain electrode 175, and the drain electrode 175 has connecting portions 178a and 178b that are disposed close to and in parallel with the data line 171 and extend symmetrically with respect to the central line of adjacent gate lines 121. Accordingly, the drain electrode 175, the capacitive coupling electrode 176, and the capacitive auxiliary electrode 136 are symmetrical in shape with respect to the central line of adjacent gate lines 121. In this case, the connecting portions 178a and 178b are disposed on an outermost edge of a region surrounded by the gate lines 121 and the data lines 171 so as to prevent a reduction in transmissive region where an image is displayed and to block a texture generated in the edge of the transmissive region.

In this embodiment, the data line 171 and the capacitive coupling electrode 176 include upper layers 171r and 176r, intermediate layers 171q and 176q, and lower layers 171p and 176p that are formed of different materials. The upper layers 171r and 176r are formed of a material having excellent physical, chemical, and electrical contact characteristics to Indium Zinc Oxide (IZO) or Indium Tin Oxide (ITO), such as molybdenum (Mo), a molybdenum alloy (for example, a molybdenum-aluminum ($MoAl_2$) alloy), or chromium (Cr). The intermediate layers 171q and 176q are formed of a metal having low resistivity to reduce delay of the data signal or a voltage drop, such as an aluminum-based metal, such as aluminum (Al) or an aluminum alloy. The lower layers 171p and 176p are formed of a metal capable of preventing diffusion of an aluminum-based metal into the semiconductor layer 151 or the ohmic contact members 161 and 165, such as molybdenum (Mo), a molybdenum alloy (for example, a molybdenum-tungsten (MoW) alloy), or chromium (Cr). In FIG. 6, the lower layers, the intermediate layers, and the upper layers of the source electrode 173, the drain electrode 175, and the end portion 179 are respectively represented by reference numerals 173p, 173q, 173r, 175p, 175q, 175r, 179p, 179q, and 179r.

Like the gate lines 121 and the storage electrode lines 131a and 131b, the walls of the data lines 171, the capacitive coupling electrodes 176, and the drain electrodes 175 are inclined at an angle of from about 30 to 80°.

The ohmic contacts 163 and 165 are interposed only between the underlying semiconductor layer 154 and the overlying data lines 171 and drain electrodes 175, thereby reducing contact resistance. The island-shaped semiconductor layer 154 has exposed portions that are provided between the source electrodes 173 and the drain electrodes 175 and are not covered with the data lines 171 and the drain electrodes 175.

A passivation layer 180 is formed on the data lines 171, the drain electrodes 175, the capacitive coupling electrodes 176, and the exposed portions of the semiconductor layer 154 that are not covered with the data lines 171, the drain electrodes 175, and the capacitive coupling electrodes 176. The passivation layer 180 has excellent planarization characteristics, and is preferably formed of an organic material having photosensitivity, an insulating material having a low dielectric constant of 4.0 or less, such as a-Si:C:O or a-Si:O:F, that is formed using a plasma enhanced chemical vapor deposition (PECVD), or an inorganic material, such as a silicon nitride or a silicon oxide.

A plurality of contact holes 182, 185a, and 185b are formed in the passivation layer 180 so as to expose the extending portions 177a and 177b of the drain electrodes 175 and the end portions 179 of the data lines 171. Further, a plurality of contact holes 181 and 186 are also formed in the passivation layer 180 so as to expose the gate insulating layer 140, the capacitive auxiliary electrodes 136, and the end portions 129 of the gate lines 121. The contact holes 181, 182, 185a, 185b, and 186 may have various shapes, such as a polygon or a circle. Preferably, the contact holes 181 and 182 have an area of 0.5 mm×15 µm to 2 mm×60 µm. Walls of the contact holes 181, 182, 185a, 185b, and 186 are inclined at an angle of 30 to 85° or have a stepped shape.

In this case, the contact hole 186, through which the capacitive auxiliary electrode 136 is exposed, is located within the opening 76 of the capacitive coupling electrode 176. Therefore, even though distortion of the alignment of the liquid crystal molecules occurs due to steps on the wall of the contact hole 186, thus causing light leakage, light is blocked by the capacitive coupling electrode 176. Accordingly, an aperture ratio of each pixel can be secured and the occurrence of disclination can be prevented.

A plurality of first to third pixel electrodes 191a, 191b, and 191c, a shielding electrode 88, and a plurality of contact assistants 81 and 82 formed of ITO or IZO are formed on the passivation layer 180. Alternatively, the first to third pixel electrodes 191a, 191b, and 191c may be formed of a transparent conductive polymer. In the case of a reflective LCD, the first to third pixel electrodes 191a, 191b, and 191c may be formed of a non-transparent reflective metal. In this case, the contact assistants 81 and 82 may be formed of a material that is different from the material of the first to third pixel electrodes 191a, 191b, and 191c, for example, ITO or IZO.

The first to third pixel electrodes 191a, 191b, and 191c are physically and electrically connected to the drain electrode 175 through the contact holes 185a, 185b, and 186. Then, the data voltage is applied from the drain electrode 175 to the first to third pixel electrodes 191a, 191b, and 191c.

The pixel electrode 191 and the common electrode 270 constitute a capacitor (referred to herein as a "liquid crystal capacitor"), such that the applied voltage is maintained after the thin film transistor is turned off. Another capacitor is connected to the liquid crystal capacitor in parallel so as to increase the voltage maintaining capability, and is called a storage capacitor. The pixel electrode 191 and the storage electrode lines 131a and 131b overlap each other so as to form the storage capacitor. In order to increase capacitance, that is, the storage capacitance of the storage capacitor, the storage electrodes 137a and 137b are provided on the storage electrode lines 131a and 131b, respectively, and the drain electrode 175 connected to the pixel electrode 191 extends and overlaps the storage electrodes 137a and 137b so as to reduce the distance between the terminals and to increase the area of overlap.

The first to third pixel electrodes 191a, 191b, and 191c are formed substantially within a region that is surrounded by the data lines 171 and the gate lines 121, and have boundaries that are disposed substantially in parallel with the gate lines 121 and the data lines 171 so as to form a rectangular shape. The first to third pixel electrodes 191a, 191b, and 191c are separated from one another. The first and second pixel electrodes 191a and 191b are formed by two parts that are respectively formed above and below the third pixel electrode 191c. That is, the third pixel electrode 191c is interposed between the first pixel electrode 191a and the second pixel electrode 191b. The first and second pixel electrodes 191a and 191b face the third pixel electrode 191c, and have sides that are inclined at an angle of ±45° with respect to the gate lines 121. Therefore, the first and second pixel electrodes 191a and 191b are symmetrical in shape with respect to the central line between adjacent gate lines 121.

The first and second pixel electrodes 191a and 191b are physically connected to a pair of rectangular extending portions 177a and 177b of the drain electrodes 175 through the contact holes 185a and 185b, respectively, such that the data voltage is directly applied from the rectangular extending portions 177a and 177b of the drain electrodes 175 to the first and second pixel electrodes 191a and 191b. The third pixel electrode 191c is connected to the capacitive auxiliary electrode 136 through the contact hole 186, and the capacitive auxiliary electrode 136 overlaps the capacitive coupling electrode 176 connected to the drain electrode 175. Therefore, the third pixel electrode 191c is electromagnetically coupled (i.e., capacitively coupled) to the first and second pixel electrodes 191a and 191b.

Each of the pixel electrodes 191 has chamfered corners, and the chamfered oblique sides have an angle of about 45° with respect to the gate lines 121. The pixel electrode 191 has central cutouts 91 and 92, lower cutouts 93a, 94a, and 95a, and upper cutouts 93b, 94b, and 95b. The pixel electrode 191 is divided into a plurality of regions by the cutouts 91 to 95b. The cutouts 91 to 95b are substantially symmetrical in shape with respect to the horizontal central line of the capacitive coupling electrode 176 or the central line between adjacent gate lines 121. The first and second pixel electrodes 191a and 191b are respectively separated from the third pixel electrode 191c by the two cutouts 93a and 93b.

The lower and upper cutouts 93a to 95a and 93b to 95b extend obliquely from the left side of the pixel electrode 191 to the right side thereof. Further, the lower and upper cutouts 93a to 95a and 93b and 95b are provided at lower and upper halves divided by the central line bisecting the pixel electrode 191 in the horizontal direction. The lower and upper cutouts 93a to 95a and 93b to 95b are inclined at an angle of about 45° with respect to the gate lines 121 and respectively extend to be perpendicular to one another. The central cutouts 91 and 92 are formed by a pair of branches that are disposed substantially in parallel with the lower cutouts 93a to 95a and the upper cutouts 93b to 95b. The central cutouts 91 and 92 have horizontal portions extending at the center thereof in the horizontal direction.

Accordingly, each of the upper and lower halves of the pixel electrode 191 is divided into six regions by the cutouts 91, 92, 93a, 93b, 94a, 94b, 95a, and 95b. These regions are symmetrical in shape with respect to a line horizontally bisecting the pixel electrode 191 and with respect to the central line between adjacent gate lines 121. Further, the regions not formed of a thin film, such as the drain electrodes 175, the storage electrode lines 131a and 131b, the capacitive coupling electrode 176, and the capacitive auxiliary electrode 136, are symmetrical in shape with respect to the line horizontally bisecting the pixel electrode 191 and with respect to the central line between adjacent gate lines 121. In this case, the number of regions or the number of cutouts varies depending on design conditions, such as the size of the pixel, an aspect ratio of the pixel electrode, and the type or characteristics of the liquid crystal layer 3.

The pixel electrode 191 overlaps the adjacent gate lines 121 or the adjacent data lines 171 so as to increase the aperture ratio.

The contact assistants 81 and 82 are connected to the end portion 129 of the gate line 121 and the end portion 179 of the data line 171 through the contact holes 181 and 182. The contact assistants 81 and 82 function to improve the adhesion of the exposed end portion 129 of the gate line 121 and the exposed end portion 179 of the data line 171 to the external device and to protect the end portions. The contact assistants 81 and 82 are connected to the external device through an anisotropy conductive layer (not shown).

When the gate driving circuit is integrated with the thin film transistor display panel 100, the contact assistant 81 can function to connect a metal layer of the gate driving circuit to the gate line 121. Similarly, when the data driving circuit is integrated with the thin film transistor display panel 100, the contact assistant member 82 can function to connect a metal layer of the data driving circuit to the data line 171.

The shielding electrode 88 extends along the data lines 171 and the gate lines 121. A portion of the shielding electrode 88 that is located on the data lines 171 completely covers the data lines 171, and a portion of the shielding electrode 88 that is provided on the gate lines 121 has a width that is narrower than the gate lines 121 and is located within the boundary of the gate lines 121. However, the width can be controlled so as to be less than that of the data lines 171, and the shielding electrode 88 can have a boundary outside the boundary of the gate lines 121. The common voltage is applied to the shielding electrode 88. To this end, the shielding electrode 88 can be connected to the storage electrode line 131 through the contact holes (not shown) of the passivation layer 180 and the gate insulating layer 140 or can be connected to a short-circuit point (not shown) at which the common voltage is transferred from the thin film transistor display panel 100 to the common electrode display panel 200. In this latter case, the distance between the shielding electrode 88 and the pixel electrodes 191 is preferably minimized so as to minimize any reduction in the aperture ratio.

If the shielding electrode 88, to which the common voltage is applied, is disposed on the data lines 171, the shielding electrode 88 blocks an electric field generated between the data lines 171 and the pixel electrodes 191 and between the data lines 171 and the common electrode 270. Therefore, the voltage distortion of the pixel electrodes 191 and the signal delay of the data voltage to be transmitted through the data lines 171 are reduced.

In addition, since the pixel electrodes 191 and the shielding electrode 88 are necessarily spaced from each other to prevent short-circuiting of the pixel electrodes 191 and the shielding electrode 88, the pixel electrodes 191 are disposed farther apart from the data lines 171, and thus, parasitic capacitance between the pixel electrodes 191 and the data lines 171 is reduced. Moreover, since the permittivity of the liquid crystal layer 3 is higher than that of the passivation layer 180, parasitic capacitance between the data lines 171 and the shielding electrode 88 is less than the parasitic capacitance between the data lines 171 and the common electrode 270 when the shielding electrode 88 is not provided. Additionally, since the pixel electrodes 191 and the shielding electrode 88 are formed in the same layer, the distance between the pixel electrode 191 and the shielding electrode 88 is constant. Therefore, parasitic capacitance between the pixel electrodes 191 and the shielding electrode 88 is constant.

The common electrode display panel 200 is now described with reference to FIGS. 4 to 6. A light-shielding member 220 is formed on an insulating substrate 210 made of transparent glass or the like. The light-shielding member 220 faces the pixel electrodes 191, and has a plurality of openings having substantially the same shape as the pixel electrodes 191. Alternatively, the light-shielding member 220 may have portions respectively corresponding to the data lines 171 and the thin film transistors.

A plurality of color filters 230 are also formed on the substrate 210. Each of the color filters 230 is substantially located within a region surrounded by the light-shielding member 220. Each of the color filters 230 may extend along a pixel electrode 191 in the vertical direction. Each of the color filters 230 may display one of the primary colors, such as red, green, and blue.

An overcoat layer 250 is formed on the color filters 230. The common electrode 270, formed of a transparent conductor, such as ITO or IZO, is formed on the overcoat layer 250. The common electrode 270 has plural sets of cutouts 71 to 76b. A set of the cutouts 71 to 76b faces one pixel electrode 191, and includes central cutouts 71, 72, and 73, lower cutouts 74a, 75a, and 76a, and upper cutouts 74b, 75b, and 76b. The cutouts 71 to 76b are disposed between the cutouts 91 to 95b of the facing pixel electrode 191 and between the edge cutouts 95a and 95b and the sides of the pixel electrode 191. Further, each of the cutouts 71 to 76b includes at least one inclined portion extending parallel with the cutouts 91 to 95b of the pixel electrode 191.

Each of the lower and upper cutouts 74a to 76a and 74b to 76b includes an inclined portion that extends downward or upward from the right side of the pixel electrode 191, and horizontal and/or vertical portions that meet the inclined portion at an obtuse angle and extend along the sides of the pixel electrode 191 from the ends of the inclined portion so as to overlap the sides of the pixel electrode 191.

Each of the central cutouts 71, 72, and 73 includes a central horizontal portion that extends substantially from the left side of the pixel electrode 191 to the horizontal portion, a pair of inclined portions that extend from the left side of the pixel electrode 191 to an end of the central horizontal portion to meet the central horizontal portion at an oblique angle, and vertical portions that extend along the left side of the pixel electrode 191 from the ends of the inclined portions so as to overlap the left side of the pixel electrode 191 and meet the inclined portions at an obtuse angle.

The number of the cutouts 71 to 76b may depend on design conditions. The light-shielding member 220 may overlap the cutouts 71 to 76b so as to prevent light leakage in the peripheries of the cutouts 71 to 76b.

Vertical alignment layers 11 and 21 are coated on the insides of the display panels 100 and 200, respectively. Further, polarizers 12 and 22 are provided on the outsides of the display panels 100 and 200, respectively. Transmissive axes of the two polarizers 12 and 22 are disposed perpendicular to each other, and one of the transmissive axes is disposed in parallel with the gate lines 121. In the case of a reflective LCD, one of the two polarizers 12 and 22 may be omitted.

The liquid crystal layer 3 has negative dielectric anisotropy, and the liquid crystal molecules 310 of the liquid crystal layer 3 are aligned such that their major axes are perpendicular to the surfaces of the two display panels when an electric field is not applied. Accordingly, incident light is blocked while not passing through the crossed polarizers 12 and 22.

A phase retardation film may be interposed between the display panels 100 and 200 and the polarizers 12 and 22 so as to complement a retardation value of the liquid crystal layer 3. The phase retardation film has birefringence and serves to reversely complement the birefringence of the liquid crystal layer 3. A uniaxial or biaxial optical film may be used as the retardation film, and, in particular, a negative uniaxial optical film may be used. Since the same common voltage is applied to the common electrode 270 and the shielding electrode 88, an electric field is not formed between the two electrodes. Accordingly, the liquid crystal molecules 310 that are disposed between the common electrode 270 and the shielding electrode 88 are maintained in the initial vertical alignment state. Therefore, light incident on that portion is blocked so that it does not pass therethrough.

If the liquid crystal molecules 310 are tilted at an angle of 45° with respect to the transmissive axes of the polarizers 12 and 22, it is possible to obtain maximum luminance. In the particular exemplary embodiment illustrated, the liquid crystal molecules 310 are tilted with respect to the gate lines 121 at an angle of 45° in all domains. Further, the gate lines 121 are disposed perpendicular to or in parallel with the edges of the display panels 100 and 200. Therefore, in the exemplary embodiment, if the polarizers 12 and 22 are attached to the display panels 100 and 200 such that the transmissive axes of the polarizers 12 and 22 are perpendicular to or in parallel with the edges of the display panels 100 and 200, it is possible both to obtain the maximum luminance and to manufacture the polarizers 12 and 22 at a low cost.

When the common voltage is applied to the common electrode 270 and the data voltage is applied to the pixel electrodes 191, a primary electric field that is substantially perpendicular to the surfaces of the display panels is formed. The alignment of the liquid crystal molecules 310 is changed depending on the electric field such that the major axes thereof are perpendicular to the direction of the electric field. Meanwhile, the cutouts 71 to 76b and 91 to 95b of the common electrode 270 and the pixel electrodes 191 and the sides of the pixel electrodes 191 distort the primary electric field and form horizontal components for determining the tilt directions of the liquid crystal molecules. The horizontal components of the primary electric field are perpendicular to the sides of the cutouts 71 to 76b and 91 to 95b and the sides of the pixel electrodes 191. Further, the horizontal components of the primary electric field at two opposing sides of the cutouts 71 to 76b and 91 to 95b are opposite to each other.

The cutouts 71 to 76b and 91 to 95b control the tilt directions of the liquid crystal molecules 310 of the liquid crystal layer 3 through the electric field. The liquid crystal molecules 310 that exist in the domains defined by the adjacent cutouts 71 to 76b and 91 to 95b and by the cutouts 76a and 76b and the sides of the pixel electrode 191 are tilted in the direction perpendicular to a lengthwise direction of the cutouts 71 to 76b and 91 to 95b. The two longest sides of each domain are disposed substantially in parallel with each other and are at an angle of about ±45° with respect to the gate lines 121. Most of the liquid crystal molecules 310 are tilted in four directions.

Preferably, the width of each of the cutouts 71 to 76b and 91 to 95b is in the range of from about 9 to about 12 μm. At least one of the cutouts 71 to 76b and 91 to 95b may be replaced with a protrusion (not illustrated) or a depression (not illustrated). The protrusion may be formed of an organic or inorganic material and disposed above or below the electric field generating electrodes 191 and 270. Preferably, the width of the protrusion is in the range of from about 5 to about 10 μm.

An apparatus and methods for repairing defects in an LCD having the above-described structures are described in detail below with reference to FIGS. 7 to 13.

Figure 7:
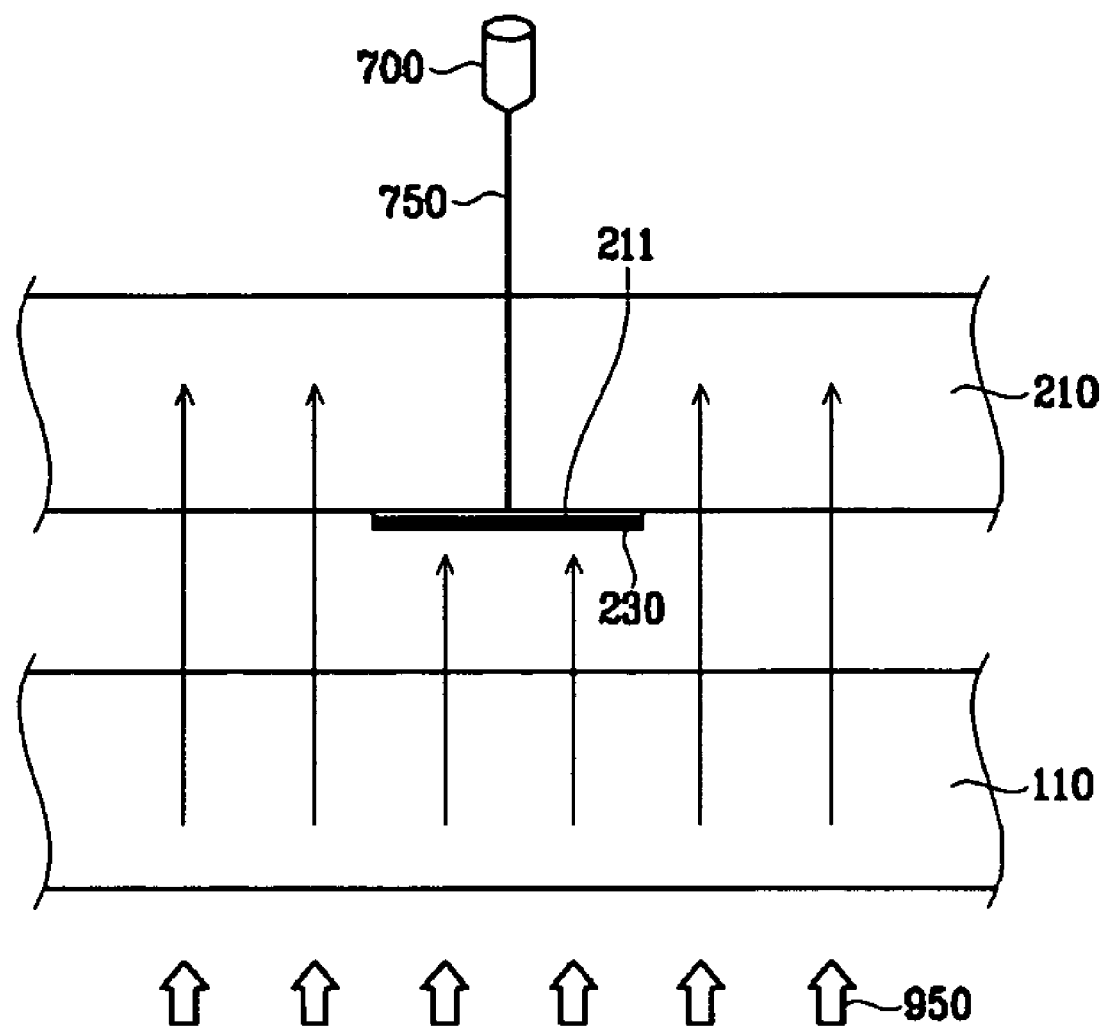
FIG. 7 is a partial cross-sectional diagram schematically illustrating an exemplary embodiment of a method for repairing an LCD in accordance with the present invention.

FIG. 7 is a diagram schematically illustrating an exemplary embodiment of a method of repairing an LCD in accordance with the present invention. FIG. 7 illustrates the lower substrate 110, the upper substrate 210 and a color filter 230 of a defective pixel of the exemplary LCD illustrated in FIG. 6. In the embodiment of FIG. 7, laser light 750 radiating from a laser device 700 disposed above the upper substrate is focused on an interface 211 between the color filter 230 of the defective pixel and the upper substrate 210. As a result of this radiation, the transmittance of the color filter 230 is changed so as to block the transmission of light from the light source unit 910 of the display through the defective pixel and thereby effect its repair.

As illustrated in FIG. 7, the laser device 700 must be disposed outside of the LCD to radiate the laser light 750 onto the color filter 230 in the desired manner. That is, it is necessary to use a laser device 700 that can radiate laser light 750 so as to pass through the polarizer 22 and the upper substrate 210, and which can change the transmittance of the color filter 230 without damaging other portions of the display, including the interface 211 of the color filter 230 and the upper substrate 210. A detailed description of this operation will now be given with reference to FIGS. 8 to 11.

Figure 8:
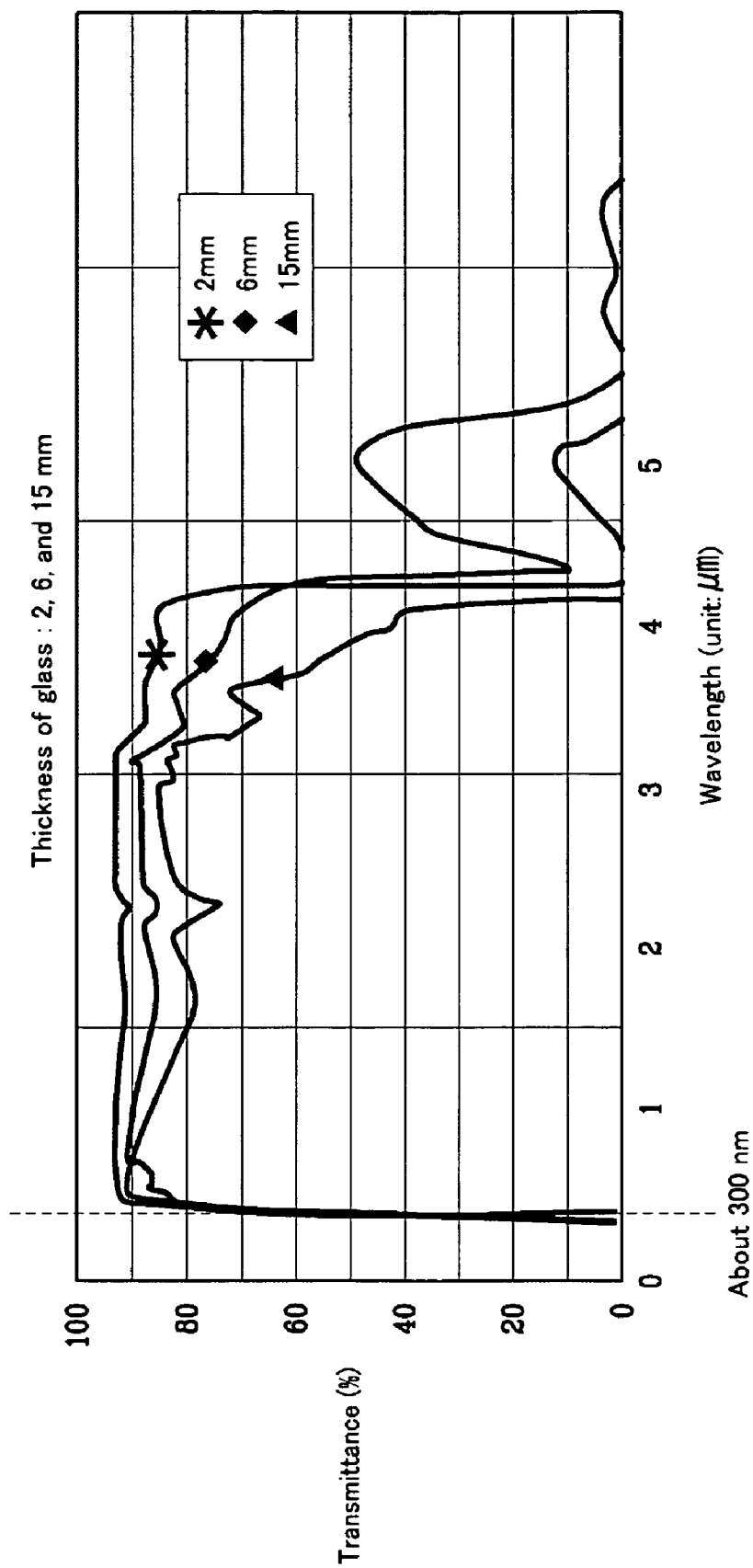
FIG. 8 is a graph showing parameters for selecting an exemplary embodiment of a laser useful for repairing the LCD in accordance with the present invention.
Figure 9:
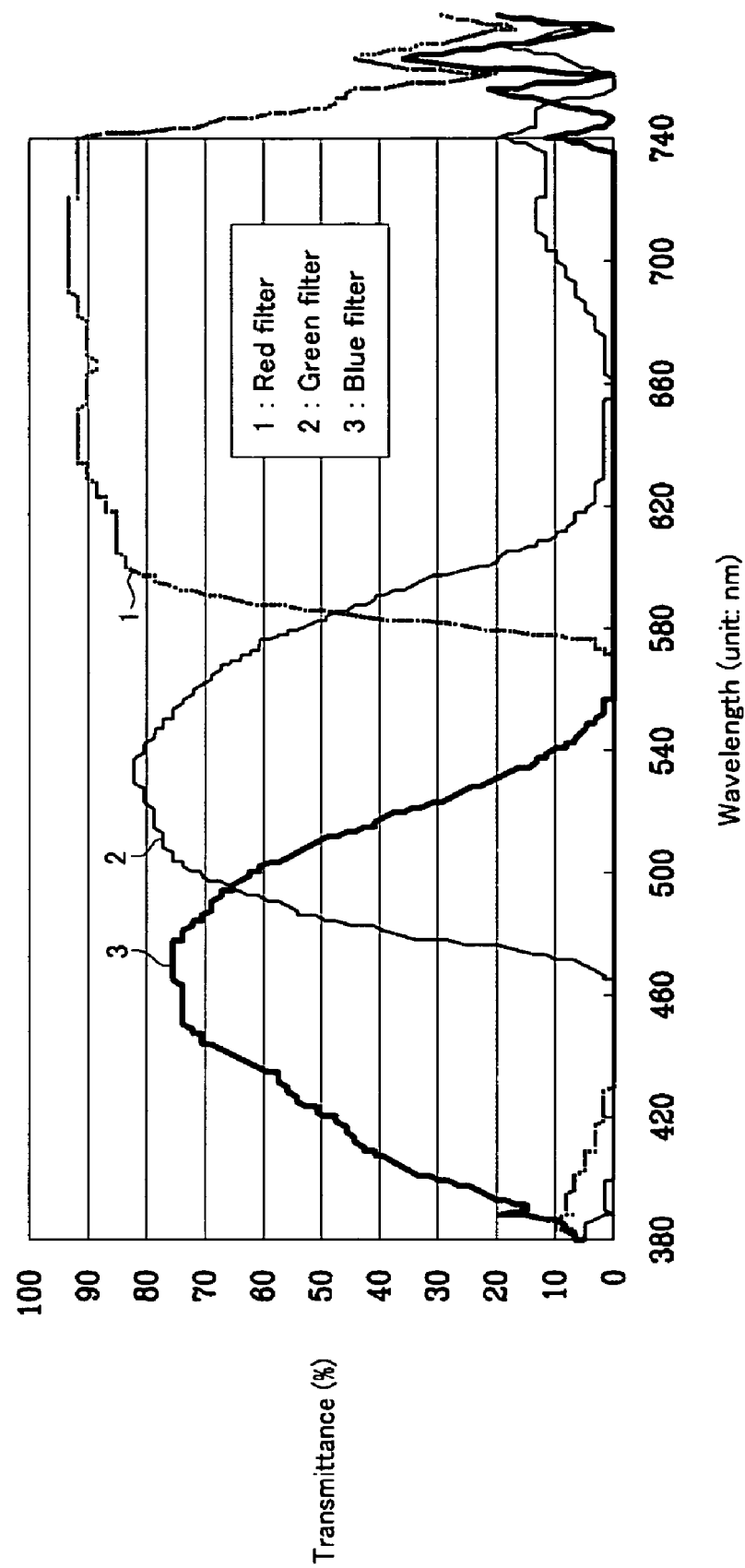
FIG. 9 is a graph showing the transmittance characteristics of color filters of the exemplary LCD.
Figure 10:
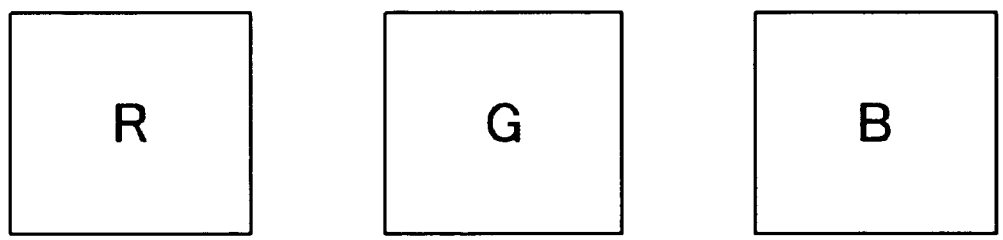
FIG. 10 is a schematic plan view of some exemplary embodiments of color filter test specimens useful in an experiment to determine laser light wavelength and pulse width in accordance with the present invention.
Figure 11:
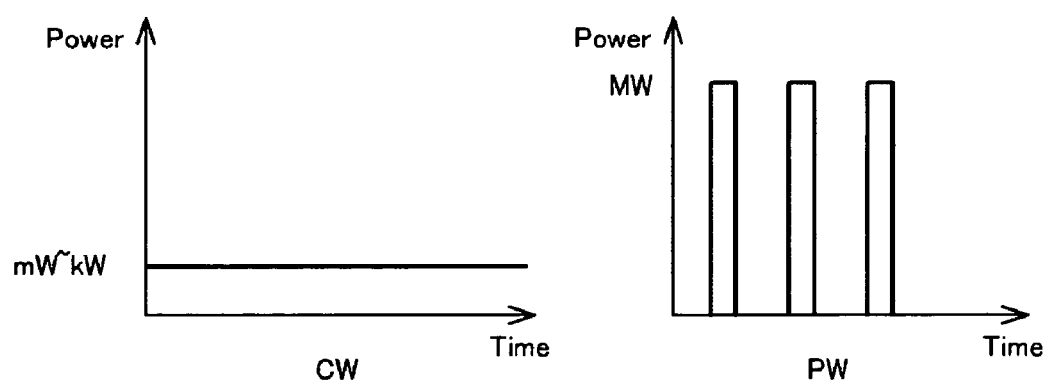
FIG. 11 is a diagram illustrating desired characteristics of laser light useful for selecting an exemplary embodiment of a laser for repairing the LCD in accordance with the present invention.

FIG. 8 is a graph illustrating the relevant parameters used to select the laser light 750 of the laser device 700 used to repair the LCD according to an exemplary method of the present invention, and FIG. 9 is a graph showing the transmittance characteristics of the color filters 230. FIG. 10 is a schematic plan view of some color filter test specimens used to evaluate the properties required of the laser light, and FIG. 11 is a diagram showing the intensity characteristics of the desired laser light used for selecting the type of laser to be used to repair the LCD according to the exemplary method.

FIG. 8 is a graph showing the measurement results of the respective transmittance of three test specimens made of glass and passing light of different wavelengths, i.e., colors. The horizontal axis of the graph represents the wavelength of the light, in units of micrometers (μm). The vertical axis of the graph represents the respective light transmittance of the specimens, expressed as a percentage of the light incident upon them.

The test specimens, which are intended to mimic the glass upper substrate 210 and color filters 230 to a certain extent, are used to specify the type of laser and laser light used to effect repairs, are preferably made of glass, such as Borofloat, and have respective thicknesses of 2 mm, 6 mm, and 15 mm. As may be seen in FIG. 8, if the wavelength of the laser light is about 300 nm or more, that is, 0.3 μm or more, and specifically, 250 nm or more, substantially all the laser light will be transmitted through the test specimens regardless of their thickness.

FIG. 9 is a graph showing the spectral characteristics of the color filters 230. Here, the horizontal axis represents the wavelength of the laser light, in units of nanometers (nm). The vertical axis of the graph represents their respective light transmittances, expressed as a percentage of the incident light.

In this exemplary embodiment of the repair method, it is preferable that the color filter 230 absorbs all of the energy of the incident laser light so as to transform the color filter 230. Accordingly, unlike the graph shown in FIG. 8, it is preferable to use a wavelength of laser light which does not pass through the filter, but rather, is completely absorbed by it. By this arrangement, it is possible to prevent damage to the underlying wires, including the data lines 171, disposed on the TFT display panel 100, which might occur as a result of the laser light passing completely through the color filter 230.

In this embodiment of the repair method, "transformation" of the color filter 230 means a change in a property of the color filter 230 caused by its irradiation with the laser light, such that light from the light source unit 910 is not transmitted through the filter, but instead, is substantially absorbed thereby. Before the transformation, it is possible that some decomposition of the color filter 230 may have occurred, such that light from the light source unit 910 is not sufficiently blocked by the filter, i.e., a "high pixel" type of defect.

As will be understood by those of skill in the art, the light absorption and transmission of the color filters 230 occur at different wavelengths according to the color of the filter, e.g., red, green, and blue, and thus, laser lights having different wavelengths may be used according to the particular filter color involved. Further, laser light having a wavelength at which absorption occurs regardless of the color involved may be selected. Laser light having such a wavelength is easier to use and requires less time to effect repairs. As may be seen by reference to FIG. 9, the wavelength of laser light having transmittance of 0 percent, that is, the wavelength at which almost all of the energy of the light is absorbed, independently of the filter color involved, is preferably about 380 nm or less, or alternatively, about 740 nm or greater.

Following is a description of the selection of the laser repair device based on the desired wavelength. FIG. 10 illustrates the separately manufactured color filter test specimens. In the test specimens, only the color filter 230 is formed thereon. That is, the polarizer 22, the overcoat layer 250, the common electrode 270, and the alignment layer 21 of the display are omitted from the test specimens.

A laser repair device 700 of the exemplary embodiment has two operating modes. One is a continuous wave (CW) mode, and another is a pulse wave (PW) mode. The graph at the left of FIG. 11 illustrates the intensity characteristic of the continuous wave mode, and the graph at the right illustrates the intensity characteristic of the pulse wave mode. In the continuous wave mode, the laser device continuously emits laser light having a constant power of several mW to several kW. In the pulse wave mode, the laser device emits a pulse of several mW or more at regular time intervals.

A laser device can be classified in accordance with the type of source that emits the laser light, that is, the light source of the laser. For example, a He—Cd laser device emits laser light having a wavelength of 543 nm and has a continuous wave mode; a Nd:YAG laser device emits laser light having the wavelength of 355 nm and has a pulse wave mode; an Ar laser device emits laser light having a wavelength of 488 nm and has a continuous wave mode; and, a Nd:YAG laser device emits laser light having a wavelength of 1064 nm and has a continuous wave mode.

The test conditions for various currently available laser devices are listed in Table 1 below.

TABLE 1

| Laser Device | Wavelength (nm) | Mode |
| --- | --- | --- |
| He—Cd | 543 | CW |
| NdYAG | 355 | PW |
| Ar | 488 | CW |
| NdYAG | 1064 | CW |

Laser light was radiated onto the color filter test specimens shown in FIG. 10 using each of the above-described laser devices. As a result, in the case of two of the laser devices, viz., He—Cd and Ar, transformation of the color filters did not occur in the test specimens even after irradiation for five minutes or more. In the case of the other two laser devices, Nd:YAG and CW, holes or transformation occurred in the color filters 230, depending on the intensity of the light. However, in the case of the latter two devices, it was confirmed that the color filter 230 was transformed and that the degree of transformation could be changed depending on the intensity or the number of pulses, that is, the pulse frequency.

As a result of the foregoing, it can be seen that it is preferable to use a pulse wave mode laser than the continuous wave mode laser to effect repairs. In addition, it is preferable that the wavelength of the laser light be between about 250 to about 380 nm, as discussed above. Of course, even if the laser were to operate in a continuous wave mode, if the wavelength or the intensity of the light were to be modified appropriately, it still possible to use the laser to effect repairs of display defects. Accordingly, it should be understood that the above-described test procedure is merely exemplary of a method for selecting the optimal repair apparatus and method, given a specific display type and structure. That is, lasers operating in either a continuous or a pulse wave mode and emitting other wavelengths of light may be used in the method of the invention, provided they achieve the desired transformation of the pixels and do not result in collateral damage to the display.

Figure 12:
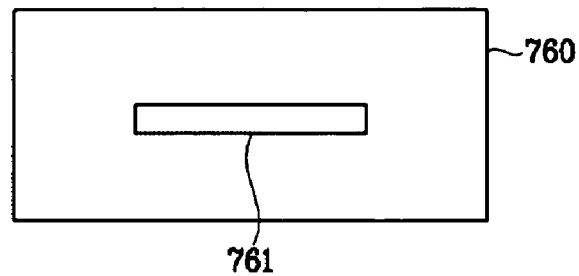
FIG. 12 is a plan view of an exemplary embodiment of a slit mask useful in a repair apparatus for the LCD in accordance with the present invention; and, FIG. 13 is a diagram illustrating an exemplary embodiment of a method for radiating laser light onto the color filters of the LCD using the exemplary repair apparatus of the present invention.

Various methods of transforming a color filter 230 using a Nd:YAG laser device having a wavelength of 355 nm and operating in the pulse wave mode is now described in detail. FIG. 12 illustrates a slit mask 760 used in an exemplary embodiment of an apparatus for repairing an LCD in accordance with the present invention, and FIG. 13 illustrates an exemplary embodiment of a method of using the apparatus to selectively radiate laser light onto a color filter 230 in accordance with the present invention.

Figure 13:
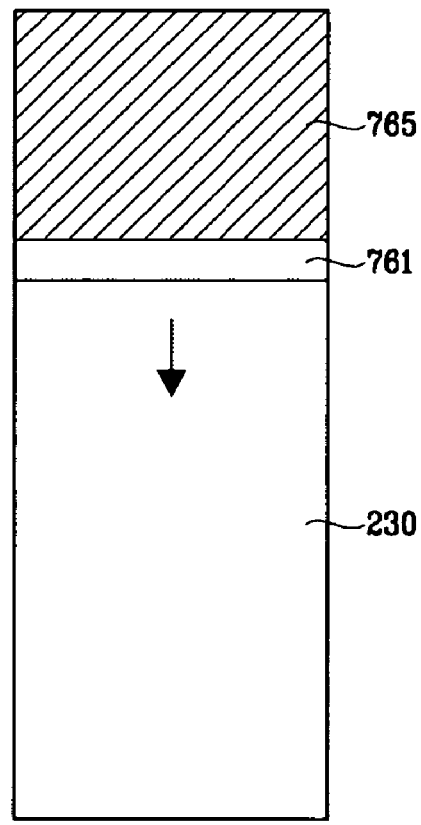

In the embodiment of FIGS. 12 and 13, the slit mask 760 functions to focus laser light onto a pixel that is to be repaired, and is used when the focus of the laser light 750 is larger than the pixel itself. The slit mask 760 includes a transmissive region 761, e.g., a slit opening, and a light-shielding region around the transmissive region 761, similar to a slit mask used to manufacture the LCD. The size of the transmissive region 761 can be controlled depending on the size of the pixel. Further, the transmissive region 761 may comprise a transparent portion of an otherwise opaque substrate or a window this is actually cut into such a substrate.

As illustrated in FIG. 13, to effect a repair of a defective pixel, laser light is radiated downward from above the color filter 230 of the pixel through the transmissive region 761 of the slit mask 760 in the direction of the arrow shown. As a result, a portion 765 of the filter onto which the laser light is radiated and corresponding in size to the slit 761 of the mask 760 is transformed, and the transmission characteristic of the color filter 230 is thereby changed as a result of the transformation. Therefore, light 950 from the light source unit 910 of the display is completely absorbed by the transformed portion of the filter.

Another exemplary embodiment of an apparatus for repairing an LCD in accordance with the present invention is described below with reference to FIGS. 6, 7, and 9. Unlike the embodiment described above, the repair apparatus comprises a laser device 700 that uses a laser light source having a pulse width ranging from femtoseconds ($10^{-15}$ sec) to picoseconds ($10^{-12}$ sec) and a wavelength of about 380 nm or greater, and more particularly, a wave length of from about 750 to about 850 nm, or alternatively, from about 1000 to about 1100 nm.

In this wavelength range, the laser light 750 of the repair apparatus can be radiated onto a substrate in which the upper substrate 210 includes a polarizer 22. That is, the polarizer 22 absorbs laser light having a wavelength of about 355 nm, and this wavelength is substantially different from the absorption wavelength and the transmission wavelengths of red, green, and blue color filters 1, 2, and 3, as illustrated in the graph of FIG. 9. Accordingly, in the case of, e.g., a green color filter 2, it is possible to achieve complete filter transformation without effecting the polarizer 22. Therefore, repairs can effected not only when the polarizer 22 is absent, but also when the polarizer 22 is attached, because the wavelength of the light necessary to effect transformation is substantially different than the absorption wavelength of the polarizer 22. That is, since it is possible to perform repairs regardless of whether the polarizer 22 is attached, repairs can be performed either during a "gross" test procedure that is performed after the two display panels 100 and 200 are combined and before the polarizers 12 and 22 are attached, or alternatively, during a "module" test procedure that is performed after the polarizers 12 and 22 are attached to the substrates.

In addition, since laser light 750 having a pulse width ranging from femtoseconds to picoseconds causes multi-photon absorption, the apparatus can also be used to repair defects in the wires of the substrates, including the data lines 171 and the gate lines 121 disposed thereon. Accordingly, it is possible to use the apparatus to repair a disconnection or a short-circuit of the wires in an "array" test and a "VI" test that are performed before the two display panels 100 and 200 are combined. Further, since laser light 750 having the foregoing pulse width transfers a relatively greater amount of energy over a relatively shorter period of time, the apparatus impacts only the desired portions of the substrate, such that its effects on peripheral portions is minimized. It is therefore particularly advantageous in embodiments in which an organic layer is used as either the wires or the color filters 230 of the display.

Thus, for example, in the case in which repairs are effected using laser light with a pulse width ranging from femtoseconds to picoseconds and a wavelength of from about 750 to about 850 nm, or alternatively, from about 1000 to about 1100 nm, it is possible to perform repairs using only a single repair apparatus during all of the test processes of the display, i.e., without needing to replace the apparatus with a different one during any of the tests.

In another possible embodiment, a laser incorporating a Ti:Sapphire or a YDFL (Yb-doped-fiber laser) light source capable of generating a pulse width of picoseconds or femtoseconds can be used as a laser light source to effect repairs. As in the exemplary embodiments described above, a slit mask 760 may also be employed to perform the repairs. That is, in the case of repairing selected ones of the signal lines, such as the data lines $D_l$ to $D_m$ and the gate lines $G_l$ to $G_n$, or in case of repairing selected ones of the color filters 230, the slit mask 760 can be used to focus on the object selected to be repaired.

As will be appreciated by those of skill in the art, in the exemplary embodiments of the present invention illustrated and described herein, an LCD device is presented as the display device being repaired. However, it should be understood that the present invention has advantageous application to any type of display that includes color filters, and not just LCDs. That is, it is possible to radiate the color filters of any type of display device with laser light as described above, and to thereby control the intensity of the light transmitted through the color filter in a desirable way. Therefore, the present invention can be applied to all types of displays in which colors or various gray representations can be distinguished by an observer.

As described above, when a laser apparatus is selected to have an appropriate pulse width and wavelength, and, particularly, when laser light having a pulse width ranging from femtoseconds to picoseconds and a wavelength of from about 750 to about 850 nm, or alternatively, from about 1000 to about 1100 nm is used, it is possible to perform repairs of displays using only a single laser device during all of the display test procedures without the need to use a different repair device during any of the tests.

By now, those of skill in this art will appreciate that many modifications, substitutions and variations can be made in and to the display device repair apparatus and methods of the present invention without departing from its spirit and scope. In light of this, the scope of the present invention should not be limited to that of the particular embodiments illustrated and described herein, as they are merely exemplary in nature, but instead, should be fully commensurate with that of the claims appended hereafter and their functional equivalents.

What is claimed is:

1. A method of repairing a display device of a type that includes a first substrate having a plurality of conductive signal lines formed thereon, the signal lines being for transmitting signals for displaying images and being connected to at least one driving signal circuit, the method comprising:

testing the display device for defects; positioning a laser above the display device;

focusing laser light radiated from the laser device onto a first the signal line of which a defect was detected among the plurality of signal lines; and, irradiating the first signal line with the laser light, wherein the laser light has a selected wavelength and a pulse width of femtoseconds to picoseconds.

2. The method of claim 1, wherein the selected wavelength is in a range of from about 750 to about 850 nm, or from about 1000 to about 1100 nm.

3. The method of claim 2, wherein the display device further includes a second substrate that faces the first substrate and on which color filters are formed.

4. The method of claim 3, wherein each of the color filters includes a first side that faces the second substrate and a second side that is opposite to the second substrate, and wherein the laser light is radiated onto the first side of selected ones of the color filters.

5. The method of claim 4, wherein the laser light is radiated through the second substrate.

6. The method of claim 5, wherein the laser light is radiated through a slit mask having a transmissive region and a light-shielding region.

7. The method of claim 6, wherein the display device further includes a light source unit that supplies light to the color filters, and wherein a transmittance of selected ones of the color filters is changed when the laser light is radiated onto the selected color filters.

8. The method of claim 7, wherein the color filters onto which the laser light is radiated are changed to absorb the light from the light source unit.

9. The method of claim 8, wherein the display device further includes a light-shielding member formed on a second substrate that surrounds the color filters.

10. The method of claim 9, wherein the light-shielding member is formed of an organic material.

11. The method of claim 10, wherein the laser comprises a Ti:Sapphire light source.

12. The method of claim 10, wherein the laser comprises a YDFL light source.

13. The method of claim 4, wherein the display device further includes a polarizer that is attached to the outside of the second substrate, and wherein the laser light radiates through the polarizer.

14. The method of claim 13, wherein the laser light is radiated through a slit mask having a transmissive region and a light-shielding region.

15. The method of claim 14, wherein the display device further includes a light source unit that supplies light to the color filters, and wherein a transmittance of selected ones of the color filters is changed when the laser light is radiated onto the selected color filters.

16. The method of claim 15, wherein the color filters onto which the laser light is radiated absorb light from the light source unit.

17. The method of claim 16, wherein the display device further includes a light-shielding member formed on a second substrate that surrounds the color filters.

18. The method of claim 17, wherein the light-shielding member is formed of an organic material.

19. The method of claim 18, wherein the laser comprises a Ti:Sapphire light source.

20. The method of claim 18, wherein the laser comprises a YDFL light source.

21. The method of claim 1, wherein the display device comprises an LCD.

* * * * *